May 18, 1965 J. B. BREWSTER ETAL 3,184,611
SIGNAL SELECTION CIRCUIT WITH CATHODE FOLLOWER
TO COMPENSATE FOR TEMPERATURE
CAUSED VOLTAGE DISTORTION
Filed Sept. 14, 1962
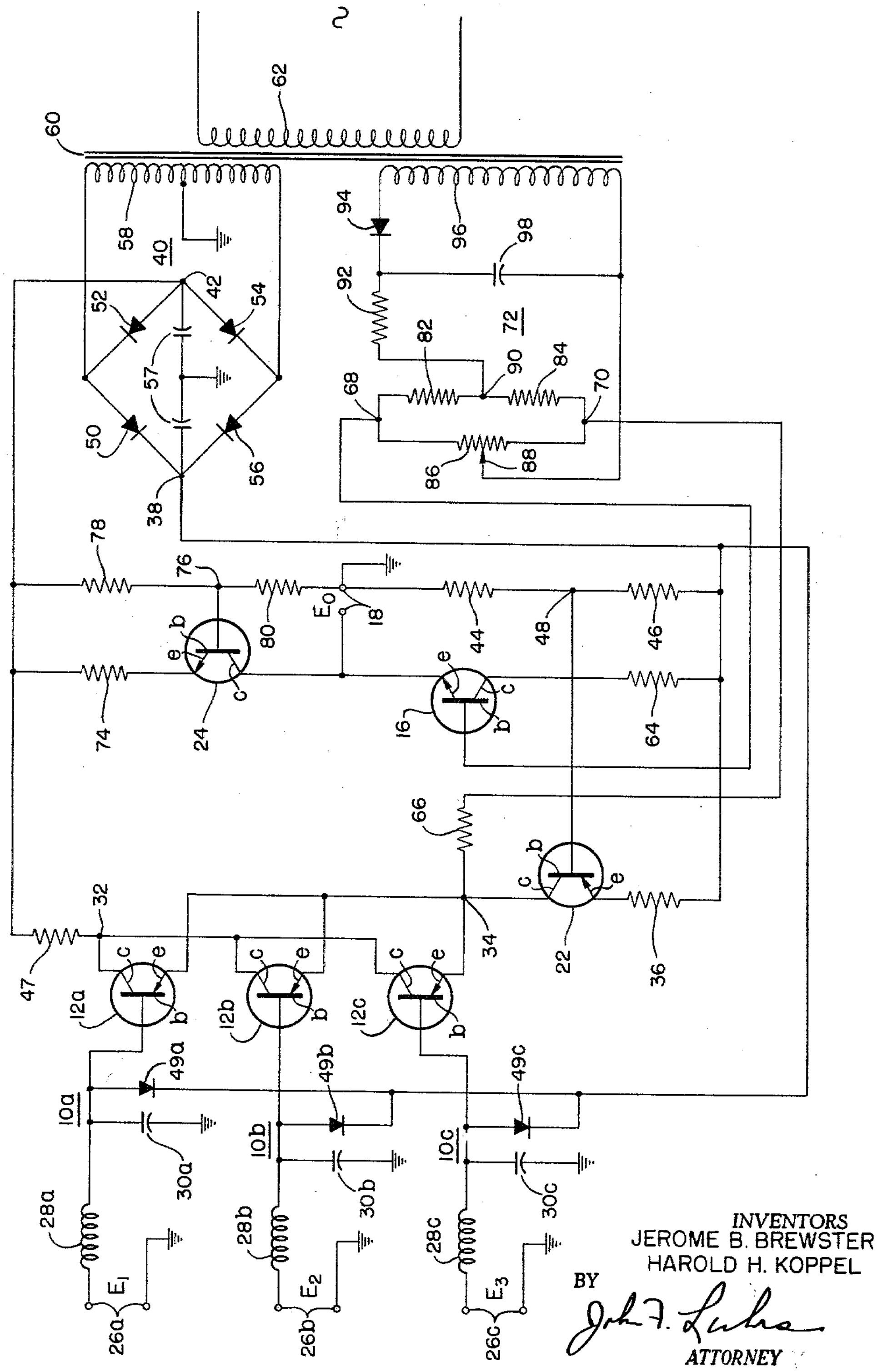
INVENTORS
JEROME B. BREWSTER
HAROLD H. KOPPEL
BY John F. Lukas
ATTORNEY

United States Patent Office 3,184,611
Patented May 18, 1965

3,184,611

SIGNAL SELECTION CIRCUIT WITH CATHODE FOLLOWER TO COMPENSATE FOR TEMPERATURE CAUSED VOLTAGE DISTORTION

Jerome B. Brewster, Cleveland, and Harold H. Koppel, University Heights, Ohio, assignors to Bailey Meter Company, a corporation of Delaware Filed Sept. 14, 1962, Ser. No. 223,789
5 Claims. (Cl. 307—88.5)

This invention relates to signal responsive devices and more particularly to a circuit for automatically selecting or auctioneering one of several electrical signals.

In a process instrumentation system it is often desired to select the most positive (or most negative) signal from several signals such as transmitter outputs. One example is a temperature control system where temperature sensing elements are placed at various locations in a furnace and it is desired to use the highest signal output for control or alarm purposes.

In an instrumentation system it is essential that such a signal auctioneering circuit possess several characteristics. Most important the circuit must during signal selection introduce a negligible error in the auctioneered signal to insure control accuracy. In addition the signals not selected must be available for other process control purposes.

It is accordingly a principal object of this invention to provide a signal selecting or auctioneering circuit which can select one signal from several signals without introducing an error into the selected or non-selected signals.

Another object of the invention is to provide an auctioneering circuit having a high impedance to input signals and low output impedance to subsequent receivers.

Another object of the invention is to provide an auctioneering circuit in which the error from temperature variations and input signal variations is negligible over a substantial signal range.

Other objects and advantages will become apparent from the following description taken in connection with the accompanying drawing, which is a schematic illustration of a signal auctioneering circuit embodying the invention.

Referring to the drawing there is shown a plurality (in this case three) input circuits 10*a*, 10*b*, and 10*c* for direct voltage input signals $E_1$, $E_2$ and $E_3$. The input circuits comprise identical circuit components which are separately identified by the reference letters *a*, *b* and *c*.

Three type PNP transistors 12*a*, 12*b* and 12*c* having base electrodes *b*, emitter electrodes *e* and collector electrodes *c* form an input auctioneering stage and are associated with input circuits 10*a*, 10*b* and 10*c* respectively to establish the desired auctioneering function. In general the transistor associated with the input circuit to which the most negative signal is applied is biased operative as an emitter follower amplifier to establish a corresponding output potential, the other transistors being biased to cut-off by said output potential.

A type NPN transistor 16 forming an output compensating stage is provided to compensate for temperature variations affecting the output of transistors 12*a*, 12*b* and 12*c* to establish a final output potential at output terminals 18. Transistors 22 and 24 serve to establish constant current sources for transistors 12*a*, 12*b* and 12*c*, and for transistor 16 respectively to prevent variations in collector current of the same with variations in the magnitude of the input signals $E_1$, $E_2$ and $E_3$.

Referring now to the specific circuitry of the signal auctioneer, the input circuit 10*a* comprises a pair of input terminals 26*a*, one of which is grounded and the other of which is connected through an inductance coil 28*a* to the base electrode *b* of transistor 12*a*. A capacitor 30*a* is connected between the base electrode *b* of transistor 12*a* and ground and forms an LC filter circuit with coil 28*a* to remove undesired A.-C. ripple components from the direct voltage input signal $E_1$. Identical components and circuit connections are provided in input circuits 10*b* and 10*c*.

The collector electrodes *c* of transistors 12*a*, 12*b* and 12*c* are connected to a common terminal 32 while emitter electrodes *e* of said transistors are connected to a common output terminal 34. Terminal 34 is connected to the collector electrode *c* of transistor 22, the emitter electrode of which is connected through resistor 36 to the positive terminal 38 of a direct voltage power supply 40 having a negative terminal 42. A pair of resistors 44 and 46 are connected in series between the positive terminal 38 and ground and form a voltage reducing circuit having a terminal 48 of intermediate potential connected to the base electrode *b* of transistor 22. To complete the input circuitry terminal 32 is connected through a current limiting resistor 47 to the negative terminal 42 of power supply 40, and three voltage limiting diodes 49*a*, 49*b* and 49*c* have their positive terminals connected respectively to base electrodes *b* of transistors 12*a*, 12*b* and 12*c* and their negative terminals connected to the positive terminal 38 of power supply 40.

Power supply 40 comprises a diode bridge rectifier consisting of diode elements 50, 52, 54 and 56 and filter capacitors 57. The rectifier bridge circuit is coupled to the secondary winding 58 of a transformer 60 having a primary winding 62 coupled to an A.-C. voltage source. As is well known to those skilled in the art the power supply 40 will function to establish a full-wave rectified direct voltage signal across terminals 38 and 42.

Referring now to the temperature compensating stage, type NPN transistor 16 has its collector electrode *c* connected by a resistor 64 to the positive power supply terminal 38 and its base electrode *b* connected through a resistor 66 and output terminals 68 and 70 of a direct voltage power supply 72 to terminal 34. The emitter electrode *e* of transistor 16 is connected to the collector electrode *c* of transistor 24, the emitter electrode *e* of the latter being connected by a resistor 74 to the negative power supply terminal 42. The base electrode *b* of transistor 24 is connected to the common terminal 76 of a pair of resistors 78 and 80 connected in series between the negative power supply terminal 42 and ground to establish a voltage reducing circuit. One output terminal 18 is connected to the emitter electrode *e* of transistor 16 while the other is connected to ground.

The power supply 72 is provided to inject an adjustable direct voltage between terminal 34 and base electrode *b* of transistor 16 to cancel any difference between the base to emitter voltage drops of PNP transistors 12*a*, 12*b* and 12*c* and NPN transistor 16. The power supply 72 comprises a resistance bridge formed by fixed resistors 82 and 84 and an adjustable slidewire resistance 86 having a movable contact 88. The junction 90 of resistors 82 and 84 is connected through a voltage divider resistor 92 and a diode rectifier element 94 to one end of a second secondary winding 96 of transformer 60. To complete the power supply circuit 72 contact 88 is electrically connected to the other end of secondary winding 96 and a capacitor 98 is connected between the junction of resistor 92 and diode element 94 and the lower end of secondary winding 96.

The power supply 72 functions to establish a half-wave rectified voltage across terminals 68 and 70 which is variable through a predetermined positive and negative range through the adjustment of the position of contact 88.

Capacitor 98 functions to filter the rectified output voltage while the bridge formed by resistors 82 and 84 and slidewire resistance 88 provide a balanceable network for establishing a voltage in a positive and negative range. Thus, an adjustable voltage is inserted in the input circuit of transistor 16 for the purpose of equalizing base to emitter voltage drops as will be more fully described in connection with the operation of the circuit.

In operation of the disclosed embodiment, transistors 12*a*, 12*b* and 12*c* are each arranged in a common collector emitter-follower circuit configuration having positive emitter voltages and negative collector voltages established by power supply 40. If signals $E_1$, $E_2$ and $E_3$ are applied to the input terminals 26*a*, 26*b* and 26*c* respectively, the transistor associated with the input circuit to which the most negative signal is applied will function as a common collector-emitter follower amplifier to establish an output potential at terminal 34 diminished by the base-emitter drop of said amplifier. The output potential at terminal 34 will reverse bias the base emitter junctions of the other input transistors and render the same inoperative. Thus, regardless of which of the input signals $E_1$, $E_2$ and $E_3$ is the most negative that input will appear at terminal 34.

Transistor 22 functions as a load for the auctioneering transistors 12*a*, 12*b* and 12*c* and is operated as a constant current generator to maintain a constant current in the collector circuits of the auctioneering transsistors to cause the base to emitter drops of the latter to be constant over the range of variation of the input signals $E_1$, $E_2$, and $E_3$. The base electrode drive of transistor 22 is supplied by the voltage divider circuit formed by resistors 44 and 46, and resistor 36 sets the current flow through transistor 22 to the optimum value.

Diode rectifier elements 49*a*, 49*b* and 49*c* function to limit the input signals to the base electrodes of transistors 12*a*, 12*b* and 12*c* to protect the transistor circuitry against abnormal positive signal conditions. One side of each diode rectifier is biased by the positive supply voltage and the other side subjected to an input signal. With this arrangement if any of the input signals become more positive than the positive potential of terminal 38 the associated diode element will conduct to thus limit the positive magnitude of the input signals to the magnitude of the positive bias voltage.

Protection against abnormal negative input signal conditions is inherently achieved by the auctioneering transistor circuitry. If the base electrode potential of one of transistors 12*a*, 12*b* and 12*c* should exceed the associated collector voltage the collector-base junction will function as a forward biased diode rectifier to limit the collector voltage to the magnitude of the negative supply voltage. Resistor 47 functions to limit the current flow during this condition to prevent damage to power supply 40.

The base to emitter drop of type PNP transistors 12*a*, 12*b* and 12*c* are substantially constant over the range of variation of input signals $E_1$, $E_2$, and $E_3$ through the provision of the constant current source comprising transistor 22, but vary with ambient temperature conditions to introduce an error in the potential of terminal 34. This will be apparent from the following equation where $E_{34}$ is the potential at terminal 34 and $E_1$ is the most negative input signal and $V_{12a}$ is the base to emitter drop of transistor 12*a*.

$$E_{34}=E_1-V_{12a}$$

To compensate for the aforementioned temperature error NPN transistor 16 functions to introduce a base to emitter voltage drop in the circuit variable with ambient temperature and having an opposite and compensating effect. More particularly transistor 16 establishes a potential at output terminals 18 equal to the potential at terminal 34 but increased by the base to emitter drop of transistor 16. This will be apparent from the following equation for the final output potential $E_0$ at terminals 18 where $V_{16}$ is the additive base to emitter drop of transistor 16.

$$E_0=E_{34}+V_{16}$$

Substituting in the last equation for $E_{34}$ from the previous equation the following results:

$$E_0=E_1-V_{12a}+V_{16}$$

Due to the differences in transistor types the base to emitter drops may not exactly cancel and a slight difference voltage may exist which can be expressed by the constant K. Thus, the last equation can be reduced to:

$$E_0=E_1+K$$

To cancel the difference in base emitter drops expressed by the constant K the movable contact 88 is adjusted to set an output of power supply 72 equal to the difference which is injected between terminal 34 and base electrode *b* of transistor 16. Thus, the base to emitter drops for all practical purposes are equal and opposite and cancel to produce an output signal at terminals 18 and 20 having a negligible error as a result of temperature variations.

Similar to the auctioneering input stage, transistor 24 is operated as a constant current generator to maintain a constant current in the collector circuit of transistor 16 to cause the base to emitter drop of the latter to be constant over the range of variation of the potential at terminal 34. The base electrode input of transistor 24 is supplied by the voltage divider circuit formed by resistors 78 and 80 and resistor 74 sets the current flow to the optimum value.

It will thus be apparent that the auctioneering circuit herein disclosed produces a negligible error in the auctioneered signal thus rendering the output suitable for control purposes where high accuracy is required. Additionally, the particular circuit configurations employed result in a high input impedance and a low output impedance to render signals not selected available for other process control purposes and to render the auctioneering circuit suitable for connection to subsequent receivers.

The circuit illustrated and described functions to select the most negative of a plurality of input signals by utilizing type PNP transistors in the input auctioneering stage and type NPN transistors in the temperature compensating stage. It will be apparent that by reversing the transistor types the circuit can be modified to select the most positive of several signals.

The disclosed circuit may also be readily employed as a signal limiter. In this application two inputs would be used, one of which would be a variable signal and the other a setpoint signal. The circuit will function to pass the variable signal only as long as it is more negative (or more positive) than the setpoint signal. By arranging a most negative signal auctioneering circuit and a most positive signal auctioneering circuit in series high and low signal limiting can be achieved.

It will be apparent to those skilled in the art that many changes may be made in the construction and arrangement of parts without departing from the scope of the invention as defined in the appended claims.

It is claimed and desired to secure by Letters Patent of the United States:

1. An auctioneering circuit for selecting the highest magnitude signal from a plurality of signals, comprising: a plurality of input circuits for the input signals respectively; an NPN transistor connected in an emitter-follower circuit configuration in each of said input circuits, each transistor having a base electrode to which the input signal is applied, an emitter electrode connected to a first terminal and a collector electrode connected to a biasing voltage, the transistor in the input circuit subjected to the highest magnitude signal being operative to establish a first signal combined algebraically with the base to emitter voltage drop of the transistor so subjected; and a compensating circuit including a PNP transistor also connected in an emitter-follower circuit configuration and having a base electrode to which said first potential is applied, an emitter electrode connected to an output terminal and a collector electrode connected to a bias voltage, said compensating circuit being effective to establish an output potential at said output terminal equal to said first potential combined algebraically with the base to emitter voltage drop of said compensating transistor in a compensating sense with respect to the base to emitter voltage drop of said input transistor to compensate for temperature variations.

2. An auctioneering circuit as claimed in claim 1 wherein an adjustable voltage source is connected between said first terminal and said base electrode of said compensating transistor for equalizing the base to emitter voltage drops of said input and compensating transistors.

3. An auctioneering circuit as claimed in claim 1 further including circuit loads for said input transistors and said compensating transistor comprising constant current generators to maintain the collector current of said input and compensating transistors constant.

4. An auctioneering circuit as set forth in claim 1 including a diode rectifier element in each of said input circuits connected between said base electrode and a voltage source for limiting the magnitude of each input signal.

5. An auctioneering circuit for selecting the lowest magnitude signal from a plurality of signals, comprising; a plurality of input circuits for the input signals respectively; a PNP transistor connected in an emitter-follower circuit configuration in each of said input circuits, each transistor having a base electrode to which the input signal is applied, an emitter electrode connected to a first terminal and a collector electrode connected to a biasing voltage, the transistor in the input circuit subjected to the lowest magnitude signal being operative to establish a first signal combined algebraically with the base to emitter voltage drop of the transistor so subjected; and a compensating circuit including an NPN transistor also connected in an emitter-follower circuit configuration and having a base electrode to which said first potential is applied, an emitter electrode connected to an output terminal and a collector electrode connected to a biasing voltage, said compensating circuit being effective to establish an output potential at said output terminal equal to said first potential combined algebraically with the base to emitter voltage drop of said compensating transistor in a compensating sense with respect to the base to emitter voltage drop of said input transistor to compensate for temperature variations.

References Cited by the Examiner

UNITED STATES PATENTS 2,874,287 2/59 Hoadley et al. ---------- 328—213

ARTHUR GAUSS, *Primary Examiner.*